United States Patent [19]

Johnson et al.

[11] Patent Number: 5,695,532
[45] Date of Patent: Dec. 9, 1997

US005695532A

[54] INTEGRATED CARBONACEOUS FUEL DRYING AND GASIFICATION PROCESS AND APPARATUS

[75] Inventors: Terence Richard Johnson, Parkville; Anthony Campisi, Ashburton; Bernard Anderson, Beaumaris; David MacLean Wilson, Canterbury; Danh Quan Huynh; Graeme Eldred Pleasance, both of Burwood, all of Australia

[73] Assignee: State Electricity Commission of Victoria, Melbourne, Australia

[21] Appl. No.: 325,366

[22] PCT Filed: May 4, 1993

[86] PCT No.: PCT/AU93/00193

§ 371 Date: Oct. 26, 1994

§ 102(e) Date: Oct. 26, 1994

[87] PCT Pub. No.: WO93/23500

PCT Pub. Date: Nov. 25, 1993

[30] Foreign Application Priority Data

May 8, 1992 [AU] Australia .............. PL 2300

[51] Int. Cl.[6] .............. C10J 3/50
[52] U.S. Cl. .............. 48/203; 48/76; 48/77; 48/86 R
[58] Field of Search .............. 48/203, 209, 210, 48/197 R, 206, DIG. 4, 77, 76, 111, 86 R; 110/221, 224, 227, 229, 341, 342; 34/359, 370, 371, 576, 589, 591; 44/605, 606, 626; 60/39.02, 39.12, 39.182

[56] References Cited

U.S. PATENT DOCUMENTS

| | | | |
|---|---|---|---|
| 1,083,683 | 1/1914 | Hirt | 48/206 |
| 1,791,411 | 2/1931 | Hillebrand | 48/206 |
| 2,113,774 | 4/1938 | Schnalfeldt | 39/371 |
| 2,614,915 | 10/1952 | Hirsch | 60/39.12 |
| 2,633,416 | 3/1953 | Gornowski et al. | 48/203 |
| 2,656,264 | 10/1953 | Yellott | 48/206 |
| 2,699,384 | 1/1955 | Peery et al. | 48/206 |
| 2,763,478 | 9/1956 | Parry | 34/591 |
| 3,817,723 | 6/1974 | Donath | |
| 3,847,563 | 11/1974 | Archer et al. | |
| 3,871,839 | 3/1975 | Moody | 48/210 |
| 3,963,426 | 6/1976 | Hand | 48/210 |
| 3,985,519 | 10/1976 | Kalina et al. | |
| 4,010,551 | 3/1977 | Rohde | 34/576 |
| 4,082,498 | 4/1978 | Offergeld et al. | 34/371 |
| 4,139,419 | 2/1979 | Limberg | 34/576 |
| 4,153,427 | 5/1979 | Bissett et al. | 48/86 R |

(List continued on next page.)

FOREIGN PATENT DOCUMENTS 145700 1/1949 Australia.
14645/76 12/1977 Australia.

(List continued on next page.)

OTHER PUBLICATIONS

"PCFB Biomass Gasification at Värnamo," *Modern Power Systems Review* Jan. 1993.

*Primary Examiner*—Timothy McMahon
*Attorney, Agent, or Firm*—Oliff & Berridge, P.L.C.

[57] ABSTRACT

This invention provides a process and apparatus for gasifying a particulate solid carbonaceous fuel with a high moisture content, the process comprising: introducing the fuel into one or more pressurized drying vessels without adding water to the fuel; reducing the moisture content of the fuel in the drying vessel(s) to a level suitable for gasification by passing hot product gas through the or each drying vessel such that the fuel particles are entrained in the gas flow, thereby cooling and humidifying the gas; separating the cooled and humidified gas from the fuel; transferring the fuel with reduced moisture content from the or each drying vessel to a gasification vessel, gasifying the fuel in the gasification vessel to produce hot product gas; and introducing at least a portion of the hot product gas into the or each drying vessel. The invention also relates to an integrated process for producing power, especially electric power, from particulate solid carbanaceous fuel.

21 Claims, 1 Drawing Sheet

U.S. PATENT DOCUMENTS

| | | |
|---|---|---|
| 4,166,802 | 9/1979 | Slater et al. . |
| 4,174,946 | 11/1979 | Rohde .................................. 34/370 |
| 4,261,167 | 4/1981 | Paull et al. ........................... 60/39.02 |
| 4,284,416 | 8/1981 | Nahas ................................. 48/197 R |
| 4,302,353 | 11/1981 | Escher et al. . |
| 4,309,197 | 1/1982 | Chukharov et al. ................... 48/210 |
| 4,689,949 | 9/1987 | Kashiwazaki et al. ................ 60/39.12 |
| 4,760,650 | 8/1988 | Theliander et al. .................... 110/224 |
| 4,769,157 | 9/1988 | Bassler et al. . |
| 4,810,258 | 3/1989 | Greene ................................ 41/626 |
| 4,976,101 | 12/1990 | Schiffers ............................. 60/39.12 |
| 5,137,539 | 8/1992 | Bowling .............................. 44/626 |
| 5,191,845 | 3/1993 | Spliethoff ........................... 110/229 |
| 5,327,117 | 7/1994 | Hauk .................................. 60/39.02 |

FOREIGN PATENT DOCUMENTS

| | | |
|---|---|---|
| 83045/82 | 1/1983 | Australia . |
| 73314/87 | 12/1987 | Australia . |
| 996353 | 9/1976 | Canada . |
| 2060077 | 8/1992 | Canada . |
| 209648 | 10/1907 | Germany . |
| 979634 | 3/1961 | Germany ............................. 48/203 |
| 25 12 317 | 2/1976 | Germany . |
| 2715927 | 10/1978 | Germany . |
| 143 789 | 8/1980 | Germany . |
| 143789 | 9/1980 | Germany ............................. 48/203 |
| 2008 93/4 | 6/1983 | Germany . |
| 213 943 | 9/1984 | Germany . |
| 3423815 A1 | 1/1986 | Germany . |
| 62-185788 | 8/1987 | Japan . |
| 3-39394 | 2/1991 | Japan . |
| 1 327 795 A3 | 11/1994 | Russian Federation . |
| 1473395 | 5/1977 | United Kingdom . |
| 1 485 542 | 9/1977 | United Kingdom . |
| 2 030 690 | 4/1980 | United Kingdom . |
| 2068019 | 8/1981 | United Kingdom ................... 48/206 |
| 2 086 411 | 5/1982 | United Kingdom . |
| 83/03100 | 9/1983 | WIPO . |
| 92/14801 | 9/1992 | WIPO . |
| 92/14802 | 9/1992 | WIPO . |
| 92/14803 | 9/1992 | WIPO . |

INTEGRATED CARBONACEOUS FUEL DRYING AND GASIFICATION PROCESS AND APPARATUS

This invention relates to a process and apparatus for converting a particulate solid carbonaceous fuel with a high moisture content into gas for combustion. More specifically the invention provides an improved process and apparatus for the gasification of moist particulate solid carbonaceous fuel which does not involve the addition of water prior to the drying stage and in which the drying of the fuel is integrated with the cooling of the product gas. The present invention is especially suitable for converting moist coal into coal gas and for convenience the invention will be hereinafter described with reference to that application. It is to be understood however, that the present invention is also suitable for converting other types of particulate solid carbonaceous fuel into gas.

Several processes are known by which coal may be converted into coal gas. These conversion processes generally occur at elevated temperatures usually between 900° C. and 1500° C. depending on the process of conversion used. The processes essentially involve the partial combustion of the coal to produce carbon monoxide rather than carbon dioxide. Hydrocarbons and hydrogen chemically contained in the coal also produce some hydrogen and methane. These processes generally involve the addition of steam and result in the production of additional hydrogen through reactions between carbon and water.

Product gas must be cooled before it can be cleaned or before its flow rate can be controlled through valves. Most methods for cooling the gas use a steam generator and superheater in which the hot gases are cooled by passing over tubes in which water is boiled to produce steam.

Most of the known gasification processes require a feed coal which has a moisture content typically below 10 to 20% dependent on the process. Oxygen blown gasifiers can accept fuels with higher moisture contents. When coal with a high moisture content is to be gasified it is first necessary to dry the coal to reduce the moisture content to a suitable level.

In a known process for converting coal with a high moisture content to gas, the coal is first dried in a steam fluidised bed drying process using hot steam to dry the coal to reduce the moisture content. The process operates at atmospheric pressure with the raw coal crushed before being fed into a bed in the drying vessel. The coal bed is fluidised by bubbling hot steam injected at the bottom, keeping the particles in the bed in constant motion. Embedded within the region of the bed are numerous tubes through which hot steam is passed to heat and dry the coal. The dry coal is cooled and stored. The coal is then transferred from the storage container to the gasifier which is located elsewhere in the plant.

The gasifier has a bed which is fluidised with either air or oxygen-enriched air which also reacts chemically with the coal to produce the product gas. It operates in such a way that most of the reactions occur in the fluid bed although fine coal particles and fine ash are carried up by the gas stream into the top part of the vessel, where more air may be injected to complete the gasification process. On leaving the vessel the gas temperature is in the order of 1000° C. and accordingly a high temperature, refractory-lined cyclone is required to remove the char particles which are returned to the gasifier.

The hot product gas is then cooled down to a temperature between 0° C. and 450° C. so that cleaning and sulphur removal can take place.

Other gasification processes are also known but these are all essentially similar to the extent that the coal is first dried and stored before being gasified in a separate process, the product gas being cooled before cleaning.

The steam fluidised bed drying process requires steam to be produced for the fluidising and drying of the coal. This can be achieved either by means of a conventional boiler or by vapour recompression of the moisture removed in the drying process. Either method requires the consumption or diversion of energy.

In a gas turbine power station with a steam turbine operating on steam produced in a heat recovery steam generator the steam for drying can be supplied from the heat recovery steam generator or bled from the steam turbine. This however, reduces the steam available for electricity generation by the steam turbine.

The use of vapour recompression requires the use of compressors for raising the pressure and temperature of the evaporated moisture. These compressors require large inputs of electrical energy. Either method of raising steam for the steam fluidised bed dryer (SFBD) reduces the station's net power output and hence its overall efficiency.

An atmospheric pressure SFBD sufficient to process coal for an electricity generating power station of, say, 400 MW capacity would be very large, adding significantly to the capital cost of the power station and hence to the cost of the electricity produced.

The proposed plants using this SFBD process include intermediate storage of the dried coal prior to gasification resulting in increased capital cost of the gas producing plant. Storing dried coal can be hazardous because of the likelihood of spontaneous combustion.

The requirement for cooling of the product gas prior to filtration results in additional capital cost for a heat exchanger to cool the gas. The heat exchanger would be prone to fouling by the unfiltered gas. This in turn would necessitate regular cleaning of the heat exchanger thus adding to the operating costs of the plant.

In the recent patent literature there are described some processes in which the gasifier product gas is used to remove moisture from the incoming fuel.

In a process for drying and gasifying coal with bound water, described in U.S. Pat. No. 4,166,802 (Texaco Inc.), it is claimed that a slurry formed by mixing the coal with water can be heated using hot gas from the gasification zone, resulting in changes to the coal structure, with water being partly eliminated from the coal particles. The drying process would operate at a very high pressure (about 90 Bar), sufficient to keep the water in the slurry in the liquid phase. After slurry heating some of the water is separated from the slurry to produce a slurry with a reduced moisture content. This water reduced slurry forms the feed to a high pressure oxygen blown gasifier. This process operates at a pressure very much higher than is required by normal gas turbines. The high pressure would result in high capital costs. Because of the high moisture content of the fuel fed to the gasifier, an oxygen blown gasifier is required to produce a satisfactory product gas. The oxygen plant also adds to the capital cost. The hydrothermal process produces a significant stream of water contaminated with organic material and treatment of this water would add to the cost of the process.

In another process, described in U.S. Pat. No. 4,769,157 (Uhde GmbH), for the disposal of sewage sludge, hot gas produced from the sewage sludge in a gasifier would be passed through the incoming sewage in order to dry it sufficiently for gasification. The resultant gas would be cleaned before disposal by burning. This process suffers from the disadvantage that all of the moisture in the incoming sludge remains in the product gas, hence resulting in a gas with a very low calorific value that is unsuitable for combustion in a gas turbine.

In a process, described in Japanese Patent No. J03039394 (Ebara Seisakusho KK), hot product gas from a gasifier is passed through a large storage reservoir containing raw material for use in the gasifier in order to eliminate char and tars from the product gas whilst at the same time drying the raw material and cooling the gas. The process is described in relation to gasification of timber offcuts and sawdust but it is claimed that the process could also be applied to other carbonaceous materials normally used for gasification such as peat, coke and coal. The process appears to pass product gas through a fixed bed of raw material in the storage reservoir, relying on an interstitial gas path for passage of the gas. Such a process would not work with a fuel which is friable and which readily breaks down into small particles as there would be insufficient area between particles to allow passage of the gas. In common with the two processes described above, this process results in excess moisture in the product gas and therefore would produce a gas with a very low calorific value unsuitable for burning in a gas turbine.

In a process for gasifying brown coal with a moisture content of 50–60% by weight, described in German Democratic Republic Patent No. 209648, a fixed bed gasifier is used. The coal is mixed with water to preserve a lump size of 5 mm to 60 mm, this being necessary to maintain a gas path through the coal bed in the gasifier. The coal is first preheated in a storage bunker to 90° C. and then predried to a moisture content of 50% in a pressurized (pressure steaming) process. It is then transferred to the gasifier where drying is completed as the coal passes downwards and hot product gas passes upwards through the bed. This process would not be useable for a friable fuel (such as Victorian brown coal) which would break down to a particle size less than 5 mm. The process also uses oxygen and steam as the gasifying medium because an airblown gasifier would produce a gas with a very low calorific value unsuitable for burning in a gas turbine. It also has the disadvantages of requiring a storage bunker for preheating the coal and of requiring a larger than normal gasifier to provide sufficient residence time for drying of the incoming coal, both of which result in increased capital cost.

It is an object of the present invention to provide a process and apparatus for gasifying a particulate solid carbonaceous fuel with a high moisture content which overcomes or at least alleviates one or more of the above mentioned disadvantages of the prior art.

Accordingly the present invention provides a process for gasifying a particulate solid carbonaceous fuel with a high moisture content, said process comprising:

introducing said fuel into one or more pressurized drying vessels without adding water to the fuel;

reducing the moisture content of said fuel in said drying vessel(s) to a level suitable for gasification by passing hot product gas through the or each drying vessel such that the fuel particles are entrained in the gas flow, thereby cooling and humidifying the gas;

separating said cooled and humidified gas from said fuel;

transferring said fuel with reduced moisture content from the or each drying vessel to a gasification vessel;

gasifying said fuel in said gasification vessel to produce said hot product gas; and introducing at least a portion of said hot product gas into the or each drying vessel.

The present invention also provides apparatus for gasifying a particulate solid carbonaceous fuel with a high moisture content, said apparatus including:

a gasification vessel for gasifying said fuel to produce hot product gas;

one or more pressurized drying vessels for reducing the moisture content of said fuel to a level suitable for gasification and for cooling and humidifying at least a portion of said hot product gas by passing at least a portion of the gas through said drying vessel(s) such that said fuel particles are entrained in the gas flow;

means for introducing said fuel into the or each drying vessel without adding water to the fuel;

means for transferring at least a portion of said hot product gas from said gasification vessel to the or each drying vessel;

means for separating said cooled and humidified gas from the or each fuel; and means for transferring said fuel with reduced moisture content from the or each drying vessel to said gasification vessel.

In a further embodiment the invention provides an integrated process for the production of power from particulate solid carbonaceous fuel with a high moisture content, said process comprising:

introducing said fuel into one or more pressurized drying vessels without adding water to the fuel;

reducing the moisture content of said fuel in said drying vessel(s) to a level suitable for gasification by passing hot product gas through the or each drying vessel such that the fuel particles are entrained in the gas flow, thereby cooling and humidifying said gas;

separating said cooled and humidified gas from said fuel;

transferring said cooled and humidified gas, optionally via a gas clean-up system and/or a condenser, to a gas turbine for the generation of power;

transferring said fuel with reduced moisture content from the or each drying vessel to a gasification vessel;

gasifying said fuel in said gasification vessel to produce said hot product gas; and introducing said hot product gas into the or each drying vessel.

The words "gasifying" and "gasification" as used herein refer to the conversion of a solid carbonaceous fuel into gas for combustion. The carbonaceous fuel may be any solid carbon based fuel such as coal, peat, woodwaste, biomass, bagasse, sewage etc.

Some carbonaceous materials may require pretreatment, such as crushing screening, predrying etc. to produce particles having flow characteristics appropriate for the particular method employed for transferring the particles into the pressurized dryer(s), and having a size sufficiently small to enable them to be entrained in the gas flow passing through the dryer(s). Although the size of the particles used in the process depends on a number of factors including the density of the material, the tendency of the material to agglomerate, the pressure, turbulence and velocity of hot gas through the dryer(s) etc. it has been found that particles having a maximum size of approximately 6 mm are especially suitable for the process.

Carbonaceous fuels suitable for use in the process of the present invention have a high moisture content. The expression "high moisture content" as used herein refers to a moisture content greater than the maximum moisture content usable in the gasification process. Most gasification processes require a solids feed coal with a moisture content typically below 10 to 20% dependent on the process oxygen blown gasifiers can accept a higher moisture content feed. Accordingly the expression "high moisture content" normally refers to a fuel with a moisture content greater than 10 or 20%. The process is especially useful for gasification of raw coal with a moisture content greater than 50%.

The moisture content of the carbonaceous fuel is reduced in one or more entrained flow dryers operating at elevated pressure, preferably similar to the pressure at which the gasifier operates. The drying method is one in 5 which the fuel particles are introduced into the hot gas stream and are carried along with it, drying as they go before reaching a separator such as cyclone. Coarse particles in the entrained flowstream, which may be still moist can optionally be separated in a classifier and recycled for further drying. Other drying processes are contemplated which combine elements of both the entrained flow and fluidised bed processes whereby a bed of material to be dried is fluidised by a hot gas but where the gas flow carries a significant part of the material above the bed for drying in an entrained flow manner and where the material so carried over may be recirculated for further drying.

One or more drying vessels may be used in conjunction with the gasifier. The actual number of drying vessels required will depend on a number of factors including the moisture content of the fuel, the size of the gasifier etc. but generally between 1 and 6 drying vessels is sufficient.

The method of introduction of the moist fuel into the drying vessel(s) also depends on the type of entrained flow dryer used. In the preferred method the fuel is fed into the or each drying vessel through a lock hopper system where the pressure is increased up to the operating pressure of the dryer. The fuel may require pre-treatment in order to ensure flow through the lock hoppers. A screw feed system may be used to introduce the fuel into the dryer(s) when this pressure is achieved.

In the process and apparatus of the present invention the gasification vessel and gasification process may be any of those previously known. Air blown gasifiers are preferred because they avoid the high capital costs of a separate oxygen plant. A particularly suitable gasifier is an air-blown fluidised bed gasifier of the High Temperature Winkler type, however, as distinct from other examples of this type the carried-over char may be passed to the dryer with the gasifier product gas instead of being separated and returned to the gasifier. While fluidised bed gasifiers are especially suitable, other gasifiers such as those which operate using an entrained flow system may also be used, but since these generally operate at higher temperatures they may require more cooling of the product gas before its entry into the dryer(s).

The gasification process essentially involves the conversion of carbon, oxygen and water to hydrogen and carbon monoxide although other gases are produced and other reactions occur in the process. In most gasification processes the heat for the process is produced by pumping an oxygen containing gas into the gasifier causing partial combustion of the fuel. The oxygen containing gas may be air directly from the atmosphere, oxygen-enriched air, pure oxygen, etc. The air pump may be integrated with a gas or steam turbine downstream of the gasifier.

Some steam or water may be injected with the air to control the temperature of operation of the gasifier. At least a portion of the gas produced in the gasifier is ducted to the drying vessel(s) where it is brought into contact with the moist fuel. Preferably all of the hot gas produced in the gasifier is ducted to the drying vessel(s). The temperature of the gas entering the drying vessel may be controlled by cooling a sidestream of the gas and remixing it with the main gas flow before entering the dryer(s), by a heat exchanger cooling all of the gas stream, by the addition of steam or water or by recycling and mixing in part of the cooled gas leaving the drying vessel with the hot gas entering the vessel. Control of exit temperature from the dryer is desirable for the overall thermal efficiency of the process and to match the dryer exit temperature with downstream requirements for control, cleaning etc. Control of temperature may also be required to avoid significant pyrolysis and tar release from the fuel during drying. The limiting temperatures are dependent on the characteristics of the carbonaceous fuel being used.

It is particularly convenient to operate the or each dryer at a similar pressure to the gasifier since this avoids the need for compression or decompression of the synthesis gas prior to entry into the dryer(s). In practice the pressure in the dryer will generally be slightly less than the pressure in the gasifier due to the pressure loss in the gas transfer line. It is preferred that the or each dryer (and the gasifier) operates at a pressure between 15 and 40 atmospheres. For integrated processes in which the cooled and humidified gas leaving the dryer(s) is ducted to a gas turbine it is also convenient to match the pressure in the dryer(s) with the pressure requirements of the gas turbine.

As the hot gas passes through the drying vessel both the moisture content of the fuel and the temperature of the gas are reduced. The or each drying vessel thereby acts as both a dryer and a cooler, partially or totally eliminating the need for a separate cooling vessel.

In the entrained flow dryer the dried fuel is carried out of the drying vessel with the cooled gas. The dried fuel may be separated from the cooled gas using any suitable separating component such as a cyclone. Classification and recycling of larger coal particles back to the dryer may be incorporated if the nature of the carbonaceous material requires it. The dried fuel can then be passed from the separator directly to the gasification vessel while the cooled gas would be ducted downstream towards the gas combustion device which may be a gas turbine or other combustor. Transfer of dried coal from the separator to the gasifier against the adverse pressure gradient may be carried out by any suitable means such as a gravity feed pipe, air jets, cell wheel, screw conveyor, lock hopper etc. or a combination of these elements.

The cooled gas leaving the separator is preferably passed through a gas clean-up system. This may include a separator such as another cyclone to remove any coal particles. The gas clean-up system may further also include a filter such as a ceramic barrier particulate solid filter or an electrostatic dust precipitator to remove fine particles including carried over coal and condensed waxes, tars and alkali salts.

The gas clean-up system may include a water scrubbing system and/or a sulphur removal process. The water scrubbing system may be used either instead of the ceramic filter or as well as the ceramic filter. Such a system might be required if the fuel contained significant amounts of sulphur or nitrogen. The water scrubbing system would also have the effect of removing some water vapour from the product gas.

Any hot gas produced in the gasifier which is not ducted to the dryer(s) may be remixed with the cooled gas after it leaves the dryer(s), preferably before the cooled gas passes through the gas clean up apparatus.

Since the process of the present invention does not involve the addition of water to the carbonaceous material before entry into the dryer(s), the product gas has a sufficiently high specific energy for most industrial applications. However if it is desired to increase the specific energy of the product gas to meet particular needs this can be done in a number of ways, including the following.

All or part of the cooled product gas could be increased in specific energy by passing it into a condenser where it could be cooled further to condense out some of the water. If only part of the gas is cooled in this way it could then be remixed with the remainder of the product gas thereby raising the specific energy of the combined gas stream.

The removal of water by condensation is relatively easy and can be carried out to increase the specific energy content of the gas. At the same time the condensation of water will cause some water scrubbing of the gas to occur, reducing harmful contaminants including ammonia.

An alternative which may avoid the need to remove water from the product gas stream would be partial enrichment of the air to the gasifier with oxygen from an air separation plant. This would produce higher energy content gases and, in certain circumstances, may avoid the need to remove water from the product gas.

The product gas may be burned in a gas turbine to produce electric power and the heat remaining in the exhaust gases may be used to drive a steam turbine also producing power. It may also be used in other industrial processes.

It will be convenient to further describe the invention by reference to the accompanying drawing which illustrates a preferred embodiment of the invention. The embodiment is based on using brown coal of a high moisture content with flow characteristics that would hinder flow through a lock hopper system. The latter quality requires the use of a predryer to condition the coal. A benefit of predrying the coal is that some of the moisture bound in the coal is removed in such a way that it does not mix with the final product gas thus increasing the specific heat of the gas resulting in a gaseous product suitable for combustion in a gas turbine. Other embodiments of the invention are possible and consequently the particularity of the accompanying drawing is not to be understood as superseding the generality of the preceding description of the invention.

Figure 1:
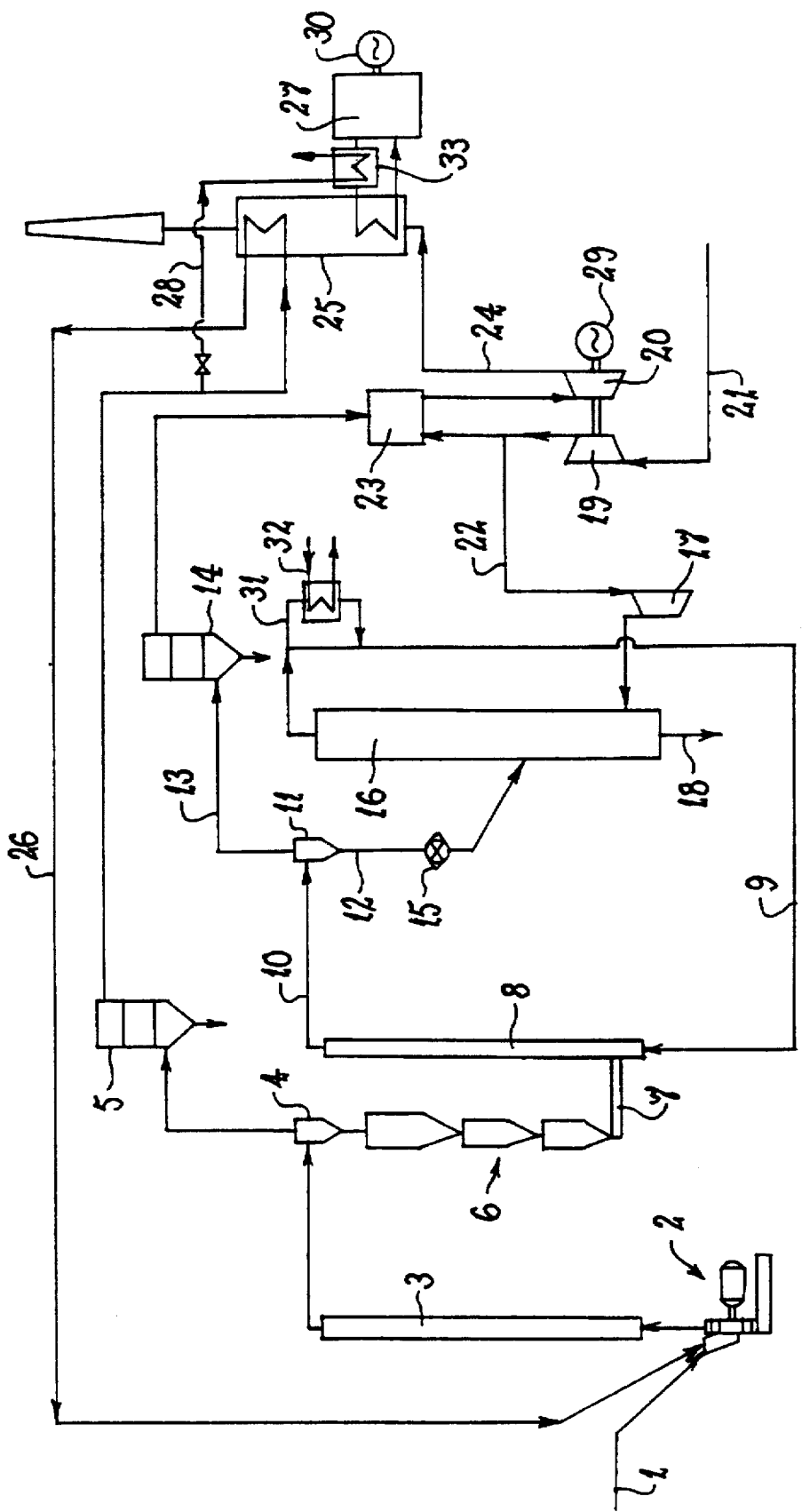
FIG. 1 is a diagrammatic representation of an embodiment of the invention including a fluidised bed gasification vessel and entrained flow drying and predrying vessels.

Raw coal (1) is fed into a mill (2) where the coal is reduced in particle size to approximately 6 mm top size and where it is mixed with superheated steam with a temperature of about 400° to 500° C., supplied via steam line (26). The coal and hot gas then traverse the length of the entrained flow predrying vessel (3) where the coal is partially dried to enable it to flow through the lock hoppers that follow.

After leaving the predrying vessel (3) the predried coal and steam are separated in a cyclone separator (4). The steam is cleaned in a filter or electrostatic precipitator (5) which removes fine particulate solids and is then recycled back to the heat recovery steam generator (25) whilst the excess steam created from the water evaporated from the coal is discharged to transferred via line (28) to a condenser (33) where it heats feed water for the steam cycle. The predried coal particles pass into series of lock hoppers (6) in order to effect a transfer from a zone of atmospheric pressure to one of about 25 atmospheres. At the bottom of the lock hoppers the coal passes into a screw conveyor (7) which feeds the coal into the bottom of the entrained flow drying shaft (8). The drying shaft is pressurised to about 25 atmospheres.

The coal is entrained in a flow of hot product gas from the gasifier (16). The gas is ducted to the bottom of the drying shaft via gas line (9). On entry into the drying shaft the gas has a temperature in the order of 750° C. to 1050° C. The hot gas is cooled inside the dryer by the evaporation of water from the wet coal and the gas leaves the dryer through outlet (10) at a temperature between 200° C. and 250° C. The dried coal and cooled gas are separated in a cyclone (11). The dry coal particles are fed to the gasifier via duct (12). Gas leaving the cyclone through outlet pipe (13) can be fed directly to a gas clean-up system (14) for removal of fine particles and deleterious gases.

The dried coal is passed from the cyclone (11), through duct (12), into the gasification vessel (16) where gasification of the coal occurs. The flow of coal to the gasifier is controlled by a rotary valve (cell wheel) (15).

The gasifier (16) is an air-blown, fluidised bed gasifier. The gasifier bed is fluidised with pressurised air produced by compressor (19) coupled to gas turbine expander (20). Air from the atmosphere is drawn into the compressor via inlet (21) and the pressurised air passed through duct (22) into the gasification vessel (16). A secondary compressor (17) in duct (22) brings the air to the required pressure. The oxygen in the air reacts chemically with the coal to assist in producing the product gas. The hot product gas passes from the gasification vessel to the entrained flow dryer through duct (9).

A sidestream (31) of the product gas is cooled in a heat exchanger (32) where steam for the steam process is raised. The cooled gas is remixed with the main gas stream in duct (9).

Char and ash are removed from the gasification vessel as indicated by stream (18).

The gas leaving the gas clean-up system (14) has a temperature of approximately 200° C., a pressure of about 24 atmospheres, a moisture content of about 32% (v/v) and a specific energy of about 4.1 MJ/kg (at 25° C.). This specific energy is sufficient to achieve maximum output from a modern gas turbine.

The gas is passed into a gas turbine combustion chamber (23) where combustion of the gas occurs to produce the hot gases required to drive the gas turbine expander (20), electric power being generated by generator (29). The gas turbine exhaust gases are then ducted to a heat recovery steam generator (25) through duct (24) to produce steam for use in a steam plant (27) where further electric power is generated by generator (30). The heat recovery steam generator (25) also produces the steam required for the predryer (3). This steam is returned back to the predryer (3) and the mill (2) along steam line (26).

To distinguish the present process from conventional integrated gasificiation combined cycle (IGCC) processes, the new combined process has been called an "integrated drying gasificiation combined cycle (IDGCC)" process. The efficiency of the present IDGCC process has been evaluated and compared with results obtained from an IGCC process.

TABLE 1

| | Coal Flow Kg/s | Gas Turbine MW | Steam Turbine MW | Sent out Energy MW | Efficiency HHV Sent Out Basis % |
|---|---|---|---|---|---|
| Proposed IDGCC | 91.1 | 235 | 138 | 339 | 37.1 |
| Conventional IGCC (vapour recompression Steam Fluidised Bed Drying) | 91.7 | 216 | 162 | 331 | 36.2 |

It can be seen that the IDGCC system produces more power from the same gas turbine, because the gas flow is augmented by the higher moisture content of the combustible gas, and at the similar overall conversion efficiency. Both processes would emit similar amounts of carbon dioxide to the atmosphere. The present process has significantly lower capital costs than the IGCC process.

The present process is able to gasify particulate solid carbonaceous material, which is moist but without free water, such as Victorian brown coal in the as-mined condition. It is especially suitable for gasifying friable particulate solid carbonaceous materials which reduce to a particle size of 6 mm and less.

The prior art using the heat in the product gas for fuel drying as revealed in the patent specifications discussed previously in this specification is related to gasifying material which is either already in the form of a sludge (e.g. sewage sludge), requires a slurry to be formed before gasifying the material or requires water to be added in order to preserve the coal in a lump size suitable for gasification and/or drying in a fixed bed process. The present process operates without the addition of water to the carbonaceous material thus resulting in a thermally more efficient process and a product gas with a higher specific energy content and hence, in the case of a power station, the amount of electrical energy sent out is greater per given quantity of fuel consumed.

The drying process is carried out in one or more entrained flow dryers which are capable of drying a particulate solid fuel without the addition of water and are smaller and hence cheaper than a comparable fixed bed or fluidised bed dryer. The drying process is integrated with the gasification process, utilising the heat of the product gas to dry the incoming fuel, thus drying the fuel and cooling the gas in a single integrated step. This eliminates the need for a separate heat exchanger to cool the product gas prior to cleaning and final use of the gas.

The drying process also operates at pressures normally associated with commercial gasifiers; such pressures are also suitable for feeding directly to a gas turbine. The process thus does not require special provisions for elevated pressures such as would be required if a hydrothermal dewatering process was utilised. Hydrothermal drying also produces a contaminated effluent which must be treated; entrained flow drying does not produce such effluents.

Finally, it is to be understood that various alterations, modifications or additions may be introduced into the process and apparatus of the present invention previously described without departing from the spirit or ambit of the invention.

What is claimed is:

1. A process for gasifying a particulate solid carbonaceous fuel with a moisture content greater than 50%, said process comprising:

introducing said fuel into a predryer at atmospheric pressure;

partially drying said fuel in said predryer sufficiently to enable said fuel to flow through at least one lock hopper into at least one pressurized drying vessel without adding water to said fuel;

introducing said partially dried fuel into said at least one lock hopper;

introducing said partially dried fuel into said at least one pressurized drying vessel without adding water to the partially dried fuel;

reducing the moisture content of said partially dried fuel in said at least one drying vessel to a level suitable for gasification by passing hot product gas through said at least one drying vessel such that the fuel particles are entrained in the gas flow, thereby cooling and humidifying the gas;

separating said cooled and humidified gas from said fuel;

transferring said fuel with reduced moisture content from said at least one drying vessel to an air-blown gasification vessel;

gasifying said fuel by introducing air into said gasification vessel to produce hot product gas, water remaining in said fuel with reduced moisture content providing a source of water for said gasification reaction; and introducing at least a portion of said hot product gas into said at least one drying vessel at a temperature such that pyrolysis of the fuel particles in the drying vessel is essentially avoided.

2. A process according to claim 1 wherein said particulate solid carbonaceous fuel has a maximum particle size of about 6 mm.

3. A process according to claim 1 wherein the pressure in said at least one drying vessel is such that the cooled and humidified gas leaving said at least one drying vessel is at a pressure suitable for the operation of a gas turbine.

4. A process according to claim 3 wherein the pressure in said at least one drying vessel is from 15 to 40 atmospheres.

5. A process according to claim 4 wherein the pressure in said at least one drying vessel is about 25 atmospheres.

6. A process according to claim 1 wherein the gasification vessel operates at essentially the same pressure as said at least one drying vessel.

7. A process according to claim 1 wherein heat is supplied to the predryer by steam produced downstream from said at least one drying vessel.

8. A process according to claim 1, wherein in the partial drying step, water is substantially removed from surfaces of fuel particles and water remains within internal portions of the fuel particles.

9. A process according to claim 8 wherein heat is supplied to the predryer by steam produced downstream from said at least one drying vessel.

10. Apparatus for gasifying a particulate solid carbonaceous fuel with a moisture content greater than 50%, said apparatus comprising:

an air-blown fluidized bed gasification vessel for gasifying said fuel to produce hot product gas;

at least one pressurized drying vessel for reducing the moisture content of said fuel to a level suitable for gasification and for cooling and humidifying at least a portion of said hot product gas by passing at least a portion of the gas through said at least one drying vessel such that said fuel particles are entrained in the gas flow;

at least one atmospheric pressure predryer for partially reducing the moisture content of said fuel sufficiently to transfer said fuel from the predryer through at least one lock hopper into said at least one drying vessel without adding water to the fuel;

means for transferring at least a portion of said hot product gas from said gasification vessel to said at least one drying vessel at a temperature such that pyrolysis of the fuel particles in said at least one drying vessel is essentially avoided;

means for separating the cooled and humidified gas from said fuel; and means for transferring said fuel with reduced moisture content from said at least one drying vessel to said gasification vessel.

11. Apparatus according to claim 10 comprising from 1 to 6 of said pressurized drying vessels.

12. Apparatus according to claim 10 wherein the pressure in said at least one drying vessel is from 15 to 40 atmospheres.

13. Apparatus according to claim 12 wherein the pressure in said at least one drying vessel is about 25 atmospheres.

14. Apparatus according to claim 12, wherein said at least one predryer is capable of removing sufficient moisture from the surface of the fuel particles to facilitate flow of the fuel through the lock hopper system into said at least one pressurized drying vessel.

15. Apparatus according to claim 14 further comprising means for transferring steam produced downstream from said at least one drying vessel to the predryer, thereby providing a heat source for the predryer.

16. Apparatus according to claim 10 wherein said at least one drying vessel and the gasification vessel are in direct communication such that they operate at essentially the same pressure.

17. Apparatus according to claim 10 wherein said fuel introducing means comprises a predryer to remove sufficient moisture from the surface of the particles to facilitate introduction of fuel into said at least one drying vessel.

18. Apparatus according to claim 17 further comprising means for transferring steam produced downstream from said at least one drying vessel to the predryer to provide a heat source for the predryer.

19. An integrated process for the production of power from particulate solid carbonaceous fuel with a moisture content greater than 50%, said process comprising:

introducing said fuel into a predryer at atmospheric pressure;

partially drying said fuel in said predryer sufficiently to enable said fuel to flow through at least one lock hopper into at least one pressurized drying vessel without adding water to said fuel;

introducing said partially dried fuel into said at least one lock hopper;

introducing said partially dried fuel into at least one pressurized drying vessel without adding water to the partially dried fuel;

reducing the moisture content of said partially dried fuel in said at least one drying vessel to a level suitable for gasification by passing hot product gas through said at least one drying vessel such that the fuel particles are entrained in the gas flow, thereby cooling and humidifying said gas;

separating said cooled and humidified gas from said fuel;

transferring said cooled and humidified gas to a gas turbine for the generation of power;

transferring said fuel with reduced moisture content from said at least one drying vessel to an air-blown gasification vessel;

gasifying said fuel by introducing air into said gasification vessel to produce said hot product gas; and introducing at least a portion of said hot product gas into said at least one drying vessel at a temperature such that pyrolysis of the fuel particles in said at least one drying vessel is essentially avoided.

20. A process according to claim 19 wherein heat is supplied to the predryer by steam produced downstream from said at least one drying vessel.

21. A process according to claim 20 wherein the exhaust gases from the gas turbine are ducted to a steam generator, part of the steam produced therein being used to generate power and part being diverted to the predryer.

* * * * *